(12) United States Patent
Onomatsu et al.

(10) Patent No.: US 7,505,082 B2
(45) Date of Patent: Mar. 17, 2009

(54) BROADCASTING RECEIVER USING A DIRECTIVITY-SWITCHING ANTENNA

(75) Inventors: Takehiro Onomatsu, Osaka (JP);
Shusuke Narita, Osaka (JP)

(73) Assignee: Funai Electric Co., Ltd., Daito-Shi, Osaka (JP)

( * ) Notice: Subject to any disclaimer, the term of this patent is extended or adjusted under 35 U.S.C. 154(b) by 579 days.

(21) Appl. No.: 11/155,342

(22) Filed: Jun. 17, 2005

(65) Prior Publication Data

US 2006/0015909 A1    Jan. 19, 2006

(30) Foreign Application Priority Data

Jun. 18, 2004    (JP) .......................... P2004-181620

(51) Int. Cl.
*H04N 5/50* (2006.01)
(52) U.S. Cl. .................. 348/570; 348/731; 348/732
(58) Field of Classification Search ............... 348/570, 348/725, 726, 607, 731, 732; 725/38, 68–73; 343/720, 725, 757, 760, 893; 455/3.02, 151.1, 455/161.1, 161.3, 145
See application file for complete search history.

(56) References Cited

U.S. PATENT DOCUMENTS

| | | | |
|---|---|---|---|
| 6,697,610 B1 * | 2/2004 | Tait | 455/277.1 |
| 7,054,452 B2 * | 5/2006 | Ukita | 381/92 |
| 7,136,113 B2 * | 11/2006 | Lee | 348/725 |
| 7,206,255 B2 * | 4/2007 | Ukita | 367/38 |
| 7,242,424 B2 * | 7/2007 | Lee | 348/180 |
| 7,315,764 B1 * | 1/2008 | Sutardja et al. | 700/94 |
| 2005/0277443 A1 * | 12/2005 | Ozluturk | 455/562.1 |
| 2006/0139499 A1 * | 6/2006 | Onomatsu et al. | 348/725 |

FOREIGN PATENT DOCUMENTS

| | | |
|---|---|---|
| JP | 4-33108 | 3/1992 |
| JP | 07-202540 A | 8/1995 |
| JP | 11-298226 | 10/1997 |
| JP | 11-31912 | 2/1999 |
| JP | 2001-168627 | 6/2001 |
| JP | 2002-094448 | 3/2002 |
| JP | 2003-078467 A | 3/2003 |

OTHER PUBLICATIONS

Patent Abstracts of Japan, Publication No. 11-298226, Publication Date Oct. 29, 1999, 1 page.

(Continued)

*Primary Examiner*—Victor R Kostak
(74) *Attorney, Agent, or Firm*—Osha - Liang LLP

(57) ABSTRACT

An antenna direction allocation screen is displayed on a television connected to a broadcasting receiver. On this screen, a user allocates direction numbers "0 to 15" indicating each directivity direction of a smart antenna that is assumed in a broadcasting receiver to each direction number "(0) to (15)" that the user itself can identity a direction. Then, the broadcasting receiver records a correspondence between two direction numbers. Next, the broadcasting receiver reads the direction number "(0) to (15)" corresponding to the direction number "0 to 15" indicating the directivity direction that the smart antenna actually faces, and displays its direction number on a television.

3 Claims, 14 Drawing Sheets

OTHER PUBLICATIONS

Patent Abstracts of Japan, Publication No. 2001-168627, Publication Date Jun. 22, 2001, 2 pages.

Patent Abstracts of Japan, Publication No. 2002-094448, Publication Date Mar. 29, 2002, 2 pages.

Office Action in Japanese Patent Application 2004-181620 with partial English translation, 3 pages.

Notice of the Reason for Refusal issued in Japanese Application No. 2004-181620 mailed Oct. 28, 2008 and English translation thereof, 4 pages.

* cited by examiner

FIG. 11A    ANTENNA DIRECTION NUMBER CORRESPONDENCE
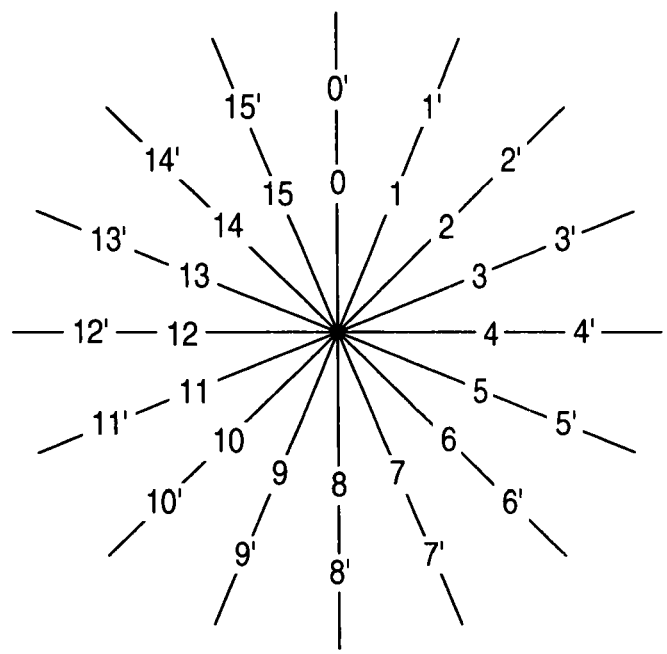
FIG. 11B    ANTENNA DIRECTION NUMBER NON-CORRESPONDENCE
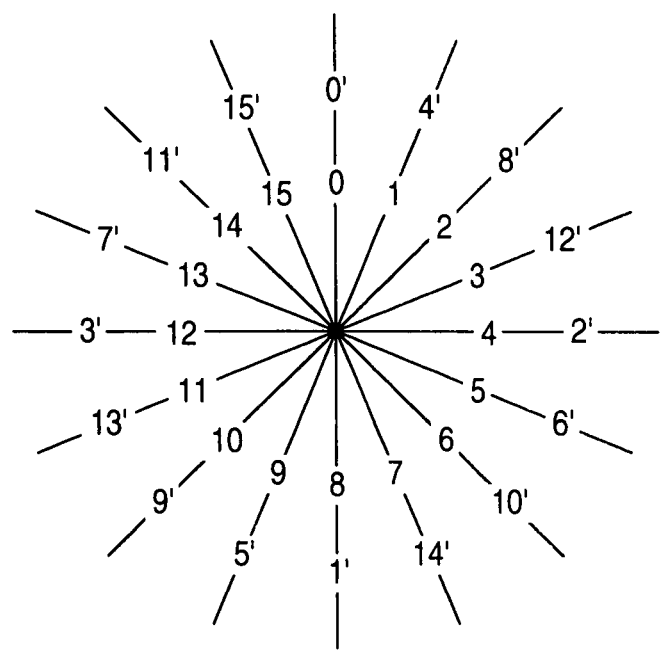

FIG. 12A    BEFORE ASSOCIATING ANTENNA DIRECTION NUMBER
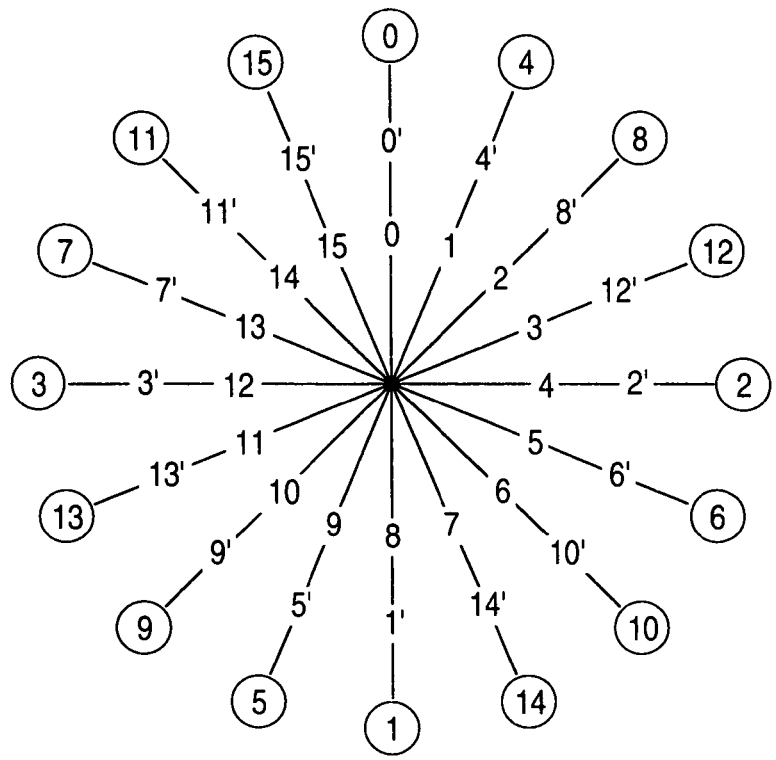
FIG. 12B    AFTER ASSOCIATING ANTENNA DIRECTION NUMBER
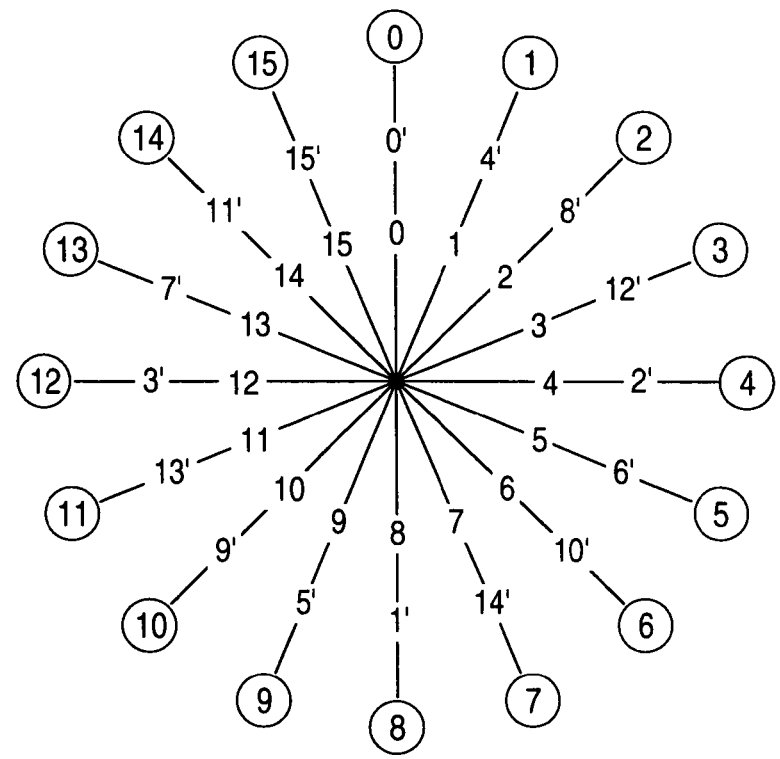

FIG. 14A    NUMBER ALLOCATION PATTERN X
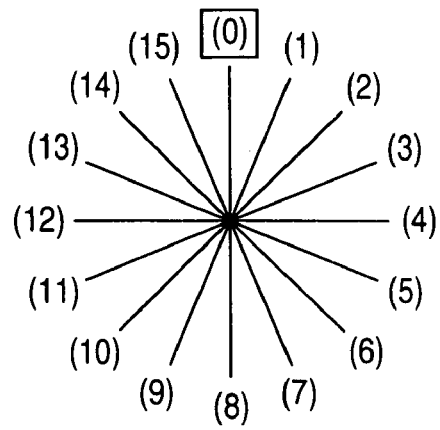
FIG. 14B    NUMBER ALLOCATION PATTERN Y
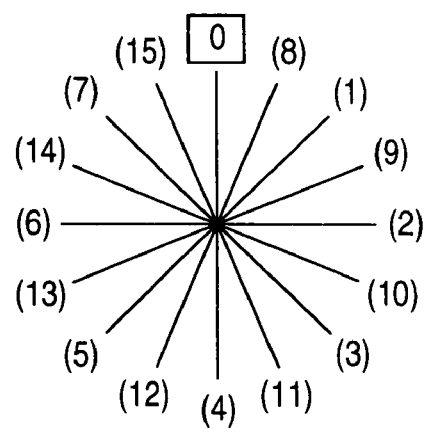
FIG. 14C    NUMBER ALLOCATION PATTERN Z
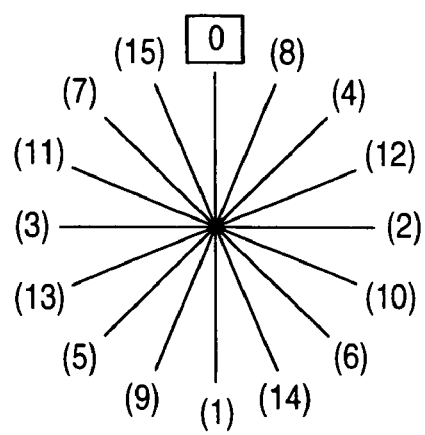

BROADCASTING RECEIVER USING A DIRECTIVITY-SWITCHING ANTENNA

BACKGROUND OF THE INVENTION

1. Field of the Invention

The present invention relates to a broadcasting receiver that receives broadcastings of predetermined channels transmitted from a plurality of broadcasting stations by using a directivity-switching antenna.

2. Description of the Related Art

In Japan, a broadcasting wave such as a television broadcasting is generally transmitted from one base station. For this reason, a broadcasting receiving antenna is fixed to face the base station at a roof, a veranda of the house and so on, and the antenna and the broadcasting receiver are connected through a cable, so that almost all of broadcastings transmitted from a plurality of broadcasting stations can be received. On the contrary, in other countries such as U.S., each broadcasting wave is individually transmitted from a plurality of broadcasting stations. Therefore, when the antenna is fixed toward one site, a broadcasting of the broadcasting station in a direction that the antenna faces can be received, while a broadcasting of the broadcasting station in the other direction that the antenna does not face cannot be received.

Here, under the above-mentioned circumstances, a broadcasting receiver using an antenna (hereinafter, referred to as a directivity-switching antenna) that can switch directivity, for example, as described in the following Patent Documents 1 and 2 has been developed. The directivity-switching antenna includes a plurality antenna elements and a plurality of phase shifters corresponding to the respective antenna elements, and thus each phase of a signal received through each antenna element is controlled and synthesized by each phase shifter, thus the directivity is electrically changed. For example, a smart antenna as an example of a directivity-switching antenna is specified to change directivity into 16 directions in the specification. A method of controlling directivity-switching antenna is disclosed in Patent Document 3 as well as the following Patent Documents 1 and 2. The broadcasting receiver transmits a control signal to the directivity-switching antenna, and switches the directivity direction of a corresponding antenna into a predetermined direction, so that a broadcasting wave in a predetermined channel transmitted from a predetermined broadcasting station is received. Further, when the broadcasting receiver receives a broadcasting wave of the predetermined channel, it stores information indicating a channel number and a directivity direction of the directivity-switching antenna at that time into a memory (see JP-A-11-298226 and JP-A-2001-168627). At this time, an identification number of a transmission source of the broadcasting wave may be stored (see JP-A-2002-094448).

Even when the directivity-switching antenna is fixed to the roof and so on, as described above, the broadcasting receiver can receive almost all of the broadcastings transmitted from a plurality of scattered broadcasting stations to set a receivable directivity direction of the directivity-switching antenna for each channel. In addition, with this arrangement, when the channels are switched by a remote controller and so on, the broadcasting receiver then reads information indicating the directivity direction in which the broadcasting of the channel after switching can be received from the memory, switches directivity of the directivity-switching antenna into that direction, and directly receives the broadcasting in the same channel. In general, images of broadcasting received by the broadcasting receiver are displayed on, for example, a television receiver (hereinafter, referred to as television), and thus a user can watch the images. In addition, a channel number of the received broadcasting is also displayed on the television so that the user can recognize it.

SUMMARY OF THE INVENTION

Conventionally, images or channel number of the broadcasting received by a broadcasting receiver are displayed on a television, while a directivity direction of the directivity-switching antenna is not displayed at all. For this reason, the user cannot know which direction such as north, east, south, and west the directivity-switching antenna faces. In addition, for this reason, the user does not know which direction of the broadcasting station the currently received broadcasting is received from with reference to its own house. In addition, when receiving sensitivity of the broadcasting wave varies depending on factors such as day and light, weathers or building surroundings around its own house, the user does not know which direction of the broadcasting station the broadcasting can be received from, and which direction of the broadcasting station the broadcasting can not be received from. Accordingly, to deal with such situations, it is considered that information indicating the directivity direction of the directivity-switching antenna is displayed on the television. However, the information indicating the directivity direction of the directivity-switching antenna is previously set by using a direction of the corresponding antenna as a reference, so that it is not related to the actual direction. Therefore, even when the information indicating the directivity direction of the directivity-switching antenna is displayed as it is, the user cannot know which direction the directivity-switching antenna faces toward.

In addition, methods of attaching information indicating a directivity direction of the current directivity-switching antenna are not unified by a specification, and thus directivity-switching antenna manufacturers and broadcasting receiver manufacturers independently attach information indicating directivity directions. For this reason, with each kind of the directivity-switching antenna connected to the broadcasting receiver, information indicating a directivity direction preset to the directivity-switching antenna does not correspond to information indicative to a directivity direction preset to the broadcasting receiver. In case that such information indicating the directivity direction does not correspond, when the broadcasting receiver transmits a control signal to instruct the directivity-switching antenna to switch the directivity direction into a predetermined direction, the directivity-switching antenna switches a directivity direction into a direction different from the direction assumed in the broadcasting receiver, so that it is inappropriate in controlling the directivity-switching antenna. Specifically, for example, when searching a predetermined channel of broadcasting, a tendency of a receiving sensitivity of the broadcasting wave is found, so that even when the broadcasting receiver regularly switches the directivity direction of the directivity-switching antenna by predetermined angles in the clockwise direction, the directivity-switching antenna irregularly switch direction or angle. Thus, the tendency of the receiving sensitivity of the broadcasting wave is not found at all, and search efficiency is lowered.

Therefore, the present invention is to solve the above-mentioned problems by allowing a user to change information indicating a directivity direction of a directivity-switching antenna for a broadcasting receiver.

According to a first aspect of the invention, there is provided a broadcasting receiver for receiving a broadcasting in a predetermined channel transmitted from a plurality of broadcasting stations by controlling a smart antenna that switches directivity in a plurality of preset directivity directions, the broadcasting receiver including: an allocating unit that allocates identification information that allows a user to identify a direction with respect to direction information indicating each of the directivity directions of the smart antenna; a direction recording unit that records correspondence between the direction information and the identification information; a display controller that reads the identification information corresponding to the direction information indicating a directivity direction that the smart antenna faces, from the direction recording unit, and displays the identification information on a display connected to the broadcasting receiver; an antenna-by-antenna direction recording unit that records antenna direction information indicating each directivity direction preset in the smart antenna, for each kind of smart antenna; an input unit that allows a user to input a kind of the smart antenna; an associating unit that reads the antenna direction information corresponding to each kind input into the input unit, from the antenna-by-antenna direction recording unit to associate with the receiver direction information indicating each directivity direction that is assumed by the broadcasting receiver; a receiver direction recording unit that records correspondence between the antenna direction information and the receiver direction information; and a switching controller that reads the antenna direction information corresponding to the receiver direction information indicating a directivity direction to be switched, from the receiver direction recording unit to switch the directivity direction of the smart antenna based on the given antenna direction information.

According to a second aspect of the invention, there is provided a broadcasting receiver for receiving a broadcasting in a predetermined channel transmitted from a plurality of broadcasting stations by controlling a directivity-switching antenna that switches directivity in a plurality of preset directivity directions, the broadcasting receiver including: an allocating unit that allocates identification information that allows a user to identify a direction with respect to direction information indicating each of the directivity directions of the directivity-switching antenna; a direction recording unit that records correspondence between the direction information and the identification information; and a display controller that reads the identification information corresponding to the direction information indicating a directivity direction that the directivity-switching antenna faces, from the direction recording unit, and displays the identification information on a display connected to the broadcasting receiver.

According to a third aspect of the invention, there is provided a broadcasting receiver for receiving a broadcasting in a predetermined channel transmitted from a plurality of broadcasting stations by controlling a directivity-switching antenna that switches directivity in a plurality of preset directivity directions, the broadcasting receiver including: an antenna-by-antenna direction recording unit that records antenna direction information indicating each directivity direction preset in the directivity-switching antenna, for each kind of directivity-switching antenna; an input unit that allows a user to input a kind of the directivity-switching antenna; an associating unit that reads the antenna direction information corresponding to each kind input into the input unit, from the antenna-by-antenna direction recording unit to associate with the receiver direction information indicating each directivity direction that is assumed by the broadcasting receiver; a receiver direction recording unit that records correspondence between the antenna direction information and the receiver direction information; and a switching controller that reads the antenna direction information corresponding to the receiver direction information indicating a directivity direction to be switched, from the receiver direction recording unit to switch the directivity direction of the directivity-switching antenna based on the given antenna direction information.

BRIEF DESCRIPTION OF THE DRAWINGS

The above objects and advantages of the present invention will become more apparent by describing preferred exemplary embodiments thereof in detail with reference to the accompanying drawings, wherein:

FIGS. 11A and 11B are diagrams showing correspondences of a direction number of a smart antenna;

FIGS. 12A and 12B are diagrams showing the switching order of a directivity direction of a smart antenna;

FIGS. 14A-14C are diagrams showing still another embodiment of the present invention.

DETAILED DESCRIPTION OF THE PREFERRED EMBODIMENTS

Figure 1:
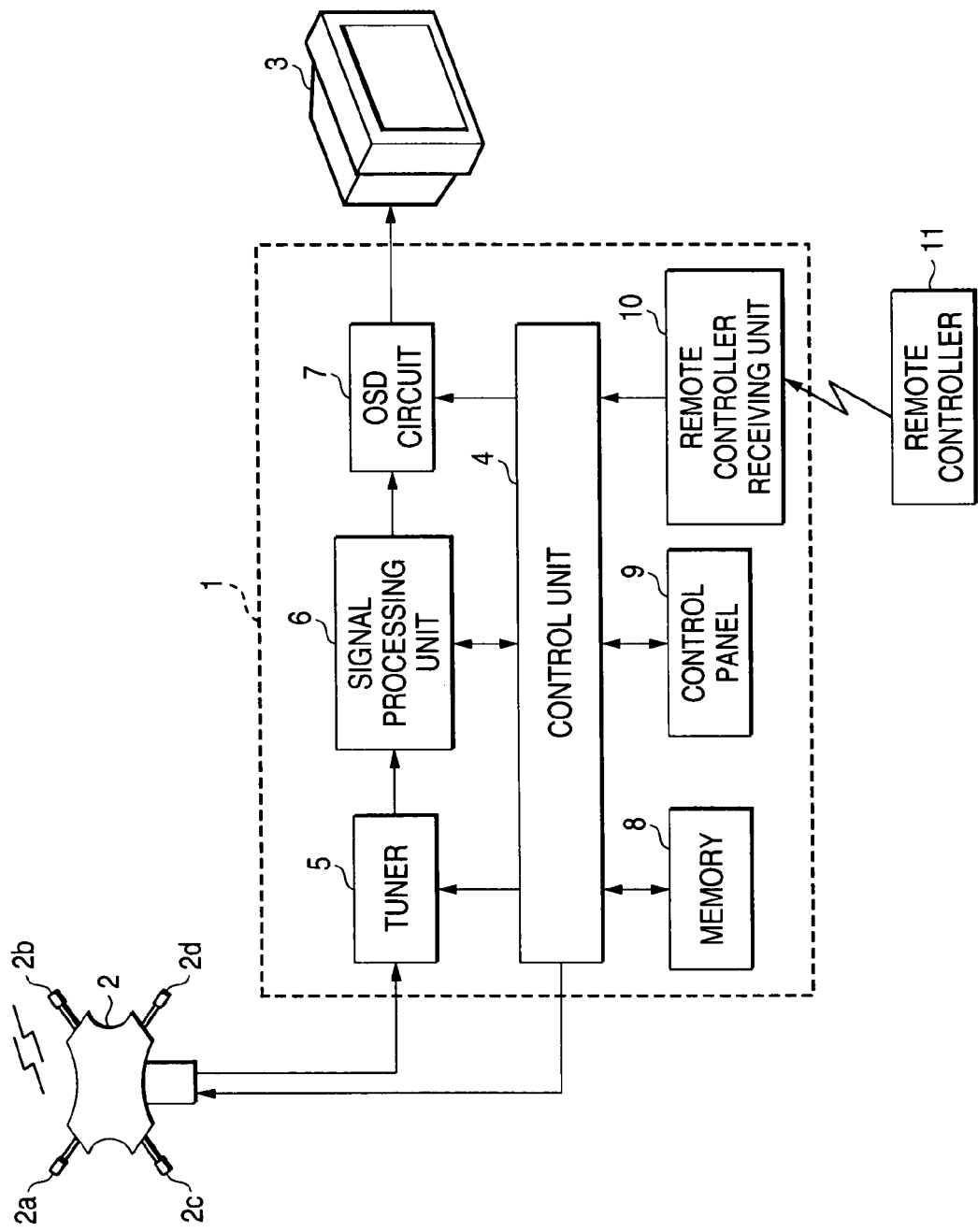
FIG. 1 is a block diagram showing a television broadcasting receiving system.

FIG. 1 is a block diagram showing a television broadcasting receiving system. In FIG. 1, reference numeral 1 denotes a broadcasting receiver, reference numeral 2 denotes a smart antenna, and reference numeral 3 denotes a television receiver (hereinafter, referred to as a television). The broadcasting receiver 1 and the television 3 are generally arranged inside the house, and are connected to each other through a cable. The smart antenna 2 is fixed to the roof or the veranda of the house, and connected to the broadcasting receiver 1 through the cable. The smart antenna 2 includes four antenna elements 2a to 2d, phase shifters arranged to correspond the respective antenna elements 2a to 2d, a synthesizer, and a control circuit (not shown other than the antenna elements 2a to 2d), and thus a phase of a signal received by each antenna element 2a to 2d is controlled by each phase shifter, and the controlled signal is synthesized by the synthesizer, so that the directivity is electrically changed into 16 directions. In addition, 16 directions refer to angle directions in which 360 degrees around the smart antenna 2 are divided into 16, and each direction is indicated as a number 0 to 15 (e.g., as shown in FIGS. 11A and 11B). The broadcasting receiver 1 controls the smart antenna 2 to switch the directivity direction of the smart antenna 2, so that the television broadcasting waves transmitted from a plurality of broadcasting stations scattered around the household are received. The broadcasting receiver 1 constitutes the broadcasting receiver according to an embodiment of the present invention, the smart antenna 2 constitutes a directivity-switching antenna according to an embodiment of the present invention, and the television 3 constitutes display means according to an embodiment of the present invention.

Reference numeral 4 denotes a control unit including CPUs, ROMs, or RAMs, and the control unit 4 controls each unit of the broadcasting receiver 1. The ROMs of the control unit 4 stores control program and data, and the RAMs stores data for control, into which data can be read and written. The control unit 4 control switching of the directivity direction of the smart antenna 2 as described below. In addition, the control unit 4 displays information indicating each directivity direction of the smart antenna 2 on the screen of the television 3, as described below. In addition, the control unit 4 allocates the information indicating each directivity direction preset to the smart antenna 2 with the information indicating each directivity direction assumed by the broadcasting receiver, as described above. In addition, the information indicative each directivity direction assumed by the broadcasting receiver 1 is information indicating each directivity direction of the smart antenna 2 preset to the broadcasting receiver 1. Information indicating each directivity direction will be described below in detail. The control unit 4 serves as switching unit, display controller and corresponding units according to an embodiment of the present invention.

Reference numeral 5 denotes a tuner, reference numeral 6 denotes a signal processing unit, and reference numeral 7 denotes an OSD circuit. The tuner 5 extracts television broadcasting signal of a predetermined channel from the television broadcasting wave received by the smart antenna 2. The signal processing unit 6 processes the television broadcasting signal output from the tuner 5 to generate an image signal and a voice signal, and output the generated image and voice signals to the television 3. The OSD circuit 7 processes image data output from the control circuit 4 so as to display on the television 3 to output it as an OSD (on-screen display). The television 3 processes the image and voice signals output from the signal processing unit 6, display the images on a monitor, and output the voice through a speaker. In addition, the television 3 processes the image data output from the OSD circuit 7, to display the images on the monitor as the OSD. Reference numeral 8 denotes a non-volatile memory 8, reference numeral 9 denotes a control panel including various keys such as a channel key or a power key, and reference numeral 10 denotes a remote controller receiving unit that receives signals from a remote controller 11. The remote controller 11 includes various keys such as a channel key, a menu key, and a cross key.

With the above arrangement, when the user connects the broadcasting receiver 1 and the smart antenna 2 and then turns on the broadcasting receiver 1, the control unit 4 presets a channel (performs initial setting). In addition, even when the user manipulates the remote controller 11 to instruct a preset operation, the control unit 4 preset the channel. First, the control unit 4 reads a channel number of the broadcasting of the broadcasting station, stored in advance in a predetermined region of the memory 8, and transmits the read channel number to the smart antenna 2 as a channel number of the search target. When the smart antenna 2 receives the channel number of the search target, each unit is set such that waves of the frequency band corresponding to the channel number can be received. After transmitting the channel number, the control circuit 4 transmits the control signal that instructs that the directivity is changed to any one of directions 0 to 15, to the smart antenna 2 in a predetermined period, and causes the smart antenna to change the directivity direction in a predetermined order. Further, when the smart antenna 2 receives the broadcasting waves of the channel number of the search target over a certain level in any directivity direction, the control unit 4 allocates the channel number of the search target with the direction number, which is information indicating the directivity direction that instructs the smart antenna 2 to switch, and records them into a predetermined region of the memory 8.

Figure 2:
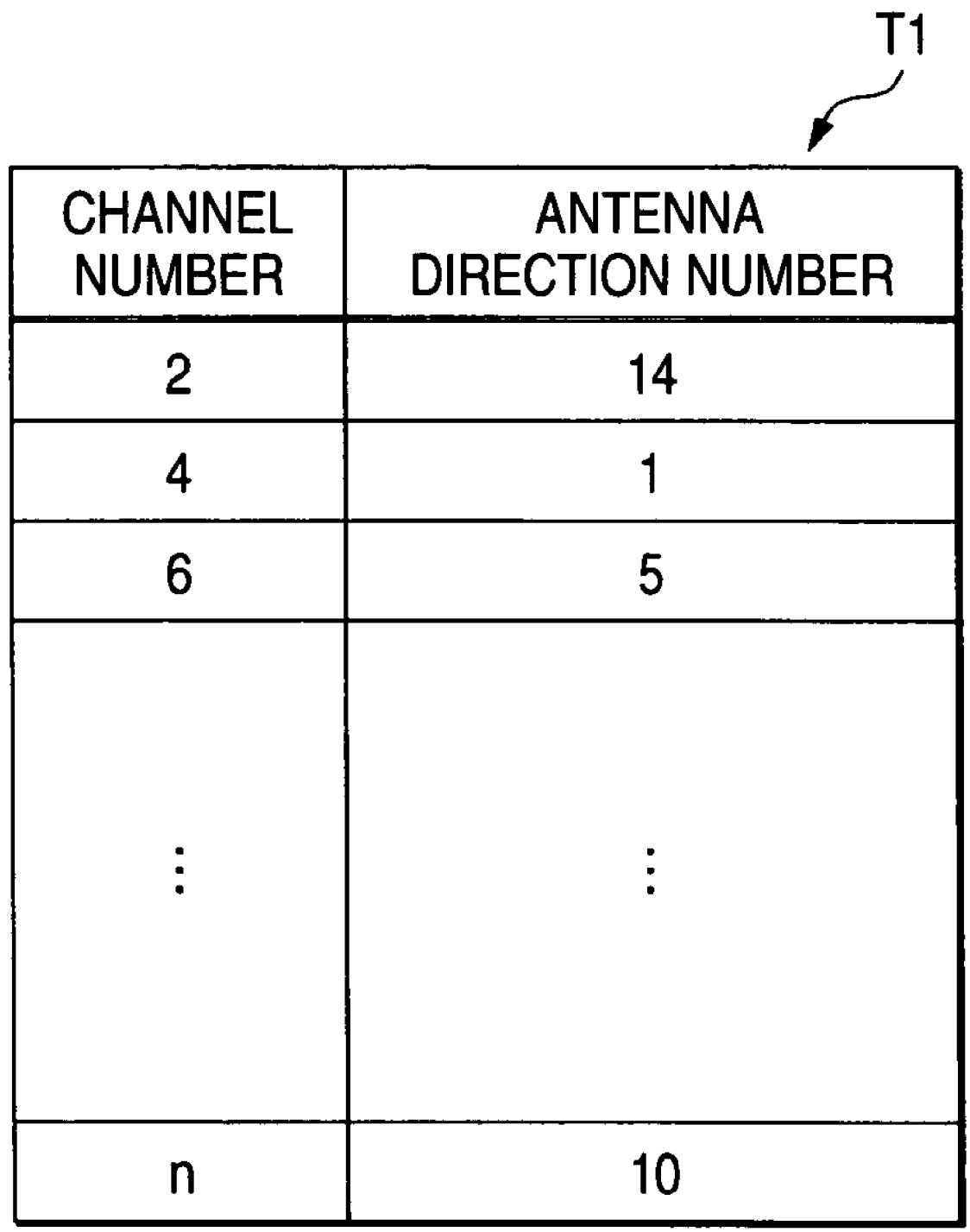
FIG. 2 is a diagram showing an example of storage contents of a memory in the broadcasting receiver.

Subsequently, the control unit 4 repeats the above sequence many times, and frequently records the channel number and the direction number of the smart antenna 2 which receives the broadcasting wave of the given channel number. Further, when the preset operation of all channels stored in advance in a predetermined region of the memory 8 is completed, a channel preset table T1 is provided on a predetermined region of the memory 8, as shown in FIG. 2. In this table T1, "2, 4, 6, . . . , n" described in the left side indicate channel numbers. "14, 1, 5, . . . , 10" in the right side indicate the direction number of the directivity direction of the smart antenna 2 recorded in association with each channel number, in other words, direction numbers of the smart antenna 2 which the broadcasting receiver 1 assumes that the broadcasting wave of each channel number is receivable.

Writing the table T1 indicates that almost all of the broadcasting waves transmitted from a plurality of broadcasting stations scattered around the household are received, and the directivity direction of the smart antenna 2 that can be received for each channel number is set to the broadcasting receiver 1. For this reason, after writing the table 1, when the user manipulates the above remote controller 11 to change the channel, the control unit 4 reads the direction number of the smart antenna that can receive the broadcasting of the channel number after switching, from the table T1, and switches the directivity direction of the smart antenna 2 in a direction shown indicated by the corresponding number, to directly receive the broadcasting wave of the same channel number. In addition, the control unit 4 processes the received broadcasting wave through the above-mentioned tuner 5 and the signal processing unit 6, directly displays the images on the television 3, and output the voices. Specifically, with the above arrangement, a time for the user to watch the broadcasting of the channel number after switching can be reduced.

Figure 3:
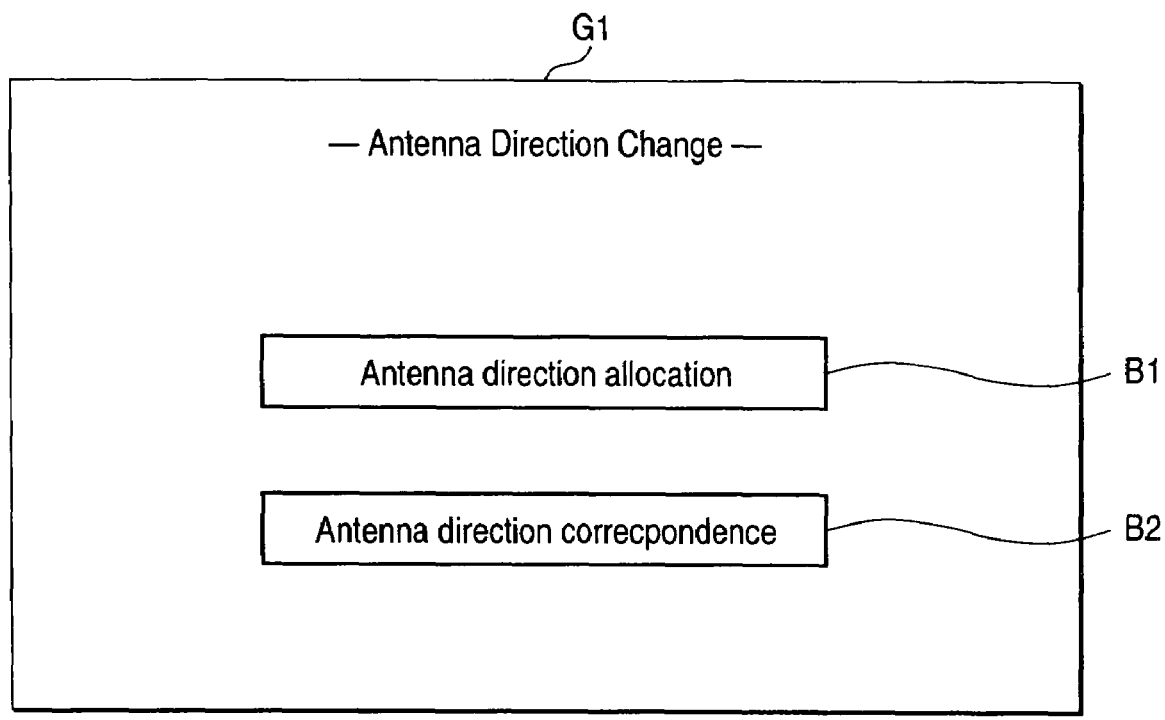
FIG. 3 is a diagram showing an example of a display screen of a television.
Figure 4:
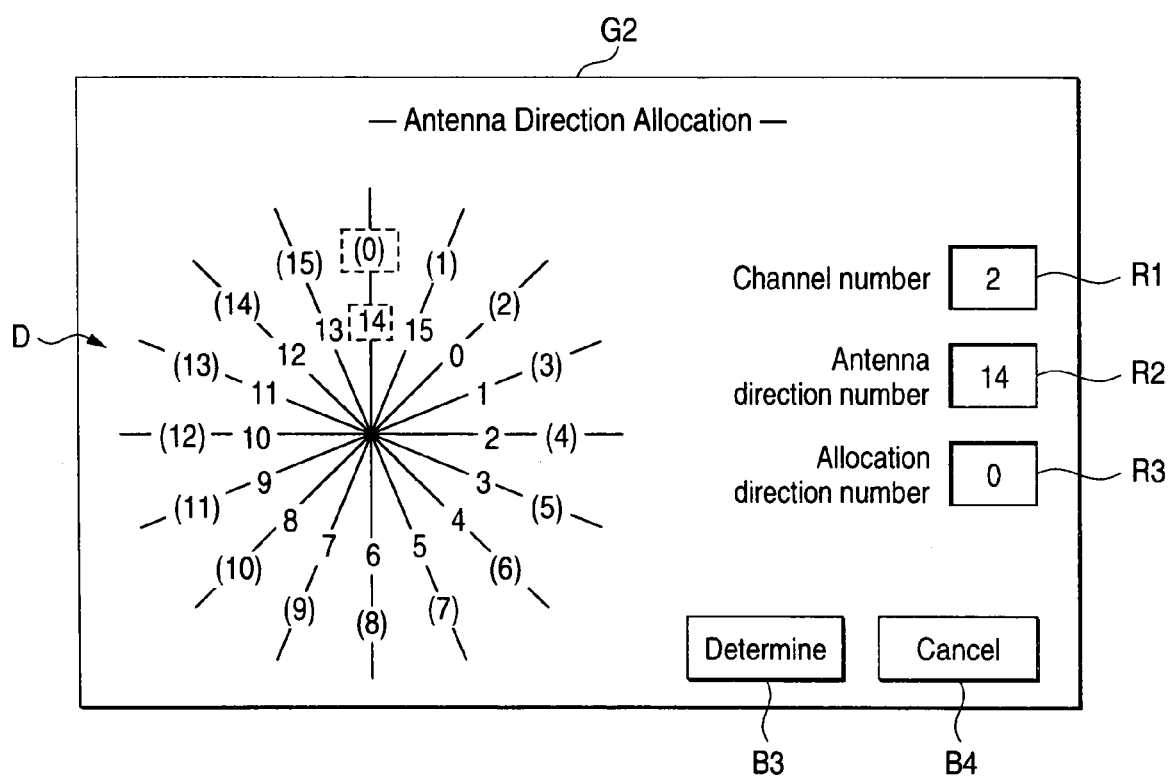
FIG. 4 is a diagram showing an example of a display screen of a television.

FIG. 3 is a diagram showing an example of a screen displayed on the above-mentioned television 3. When the user manipulates the above-mentioned remote controller 11 in the predetermined order, the control unit 4 displays an antenna direction changing screen G1 shown in FIG. 3 on the television 3 through the above-mentioned OSD circuit 7. The antenna direction changing screen G1 includes a direction allocation button B1 and an antenna direction association button B2. First, a case where the antenna direction allocation button B1 is pressed will be described. When the user manipulates the remote controller 11 to press the antenna direction allocation button B1, the control unit 4 displays the antenna direction allocation screen G2 shown in FIG. 4 rather than the screen G on the television 3.

The antenna direction allocation screen G2 is a screen for allocating the direction number which the user can identify the direction, for the direction number indicating each directivity direction of the smart antenna 2 assumed by the broadcasting receiver 1. The antenna direction allocation screen G2 serves as the allocating unit according to an embodiment of the present invention. D is a directional diagram showing each directivity direction of the smart antenna 2 in a straight line. A portion where each straight line intersects indicates the center of the smart antenna 2. "0 to 15" are direction numbers indicating each directivity direction of the smart antenna 2 assumed by the broadcasting receiver 1, and "(0) to (15)" indicates direction numbers that can be allocated by the user. In addition, according to the present invention, although the direction numbers "(0) to (15)" which are allocated are parenthesized, this is a convenient expression for discriminating from the "0 to 15", the direction numbers assumed by the broadcasting receiver 1. Besides, both direction numbers can be discriminated using different fonts or colors. Referential symbol R1 refers to an input display of the channel number, referential symbol R2 refers to an input display column of the direction number assumed by the broadcasting receiver 1, and referential symbol R3 refers to an input display column of the direction number allocated by the user. Further, referential symbol B3 refers to a determination button and B4 refers to a cancel button.

Figure 7:
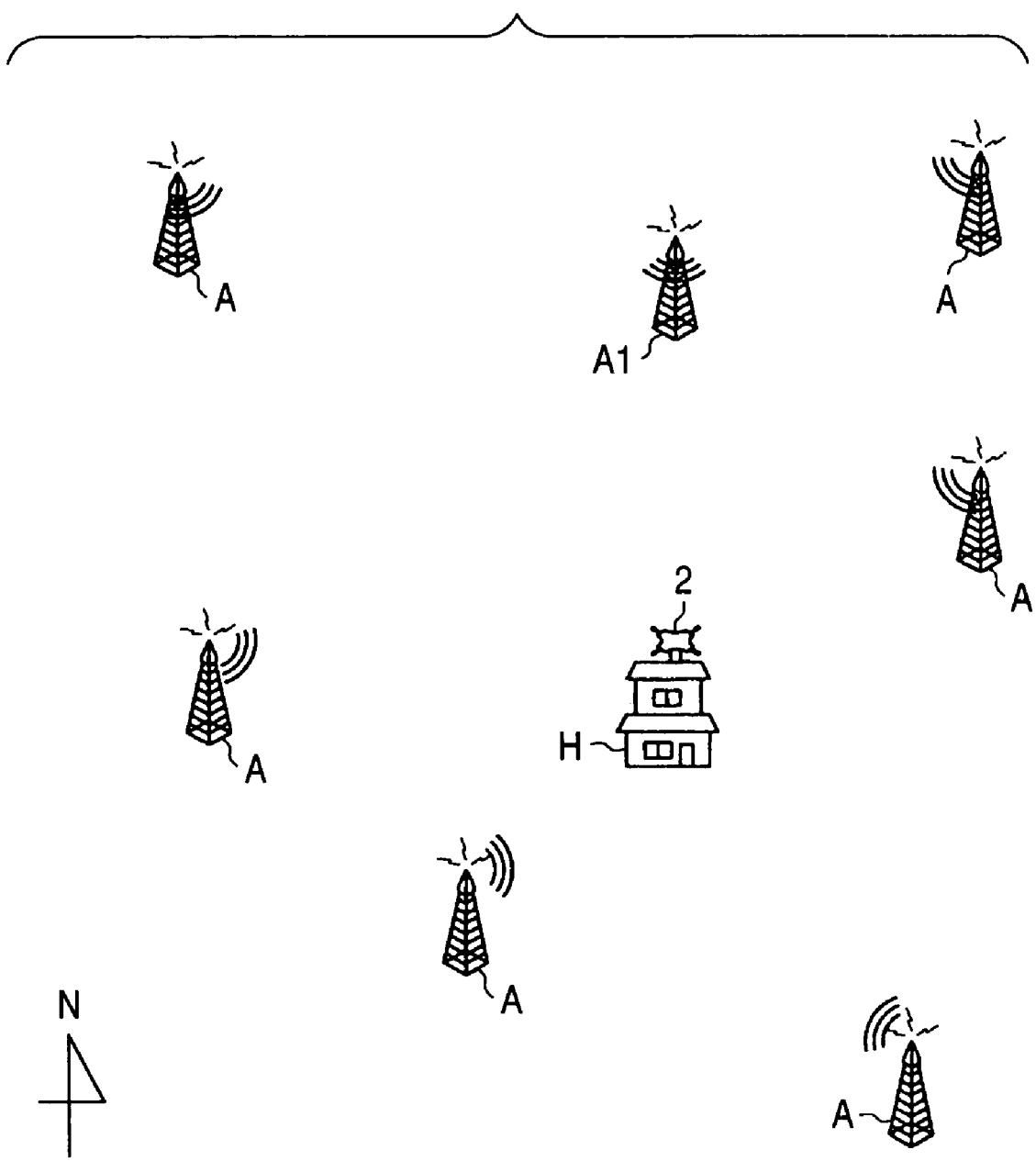
FIG. 7 is a diagram showing a scattered circumstance of broadcasting stations around the house.

Before using the antenna direction allocation screen G2, the user should know the direction of broadcasting station with respect to the house, and the channel number which is on air. For example, by referring to a map or a site that provides information with respect to the broadcasting station on the Internet, the scattered circumstances of the broadcasting stations A around the household H can be acknowledged, as shown in FIG. 7. Here, under the scattered circumstance of FIG. 7, it can be acknowledged that the broadcasting station A1 is located to the north (N) direction from the house H. In addition, by referring to newspaper television broadcasting publication columns, and Internet sites, the allocation circumstances of the channel number for the broadcasting of the each broadcasting station can be acknowledged. Therefore, under the allocation circumstances, it is acknowledged that the channel number in which the broadcasting station A1 is on air is 2, for example.

As described above, when the broadcasting station A1 is located in the north at the house, and the channel number on air is 2, on the antenna direction allocation screen G2, first, the user manipulates the remote controller 11 to input the channel number, 2, in which the broadcasting station A1 broadcasts, into the input display column R1. Next, the control unit 4 reads the direction number "14" of the smart antenna 2 which the broadcasting of the channel number "2" input from a channel preset table T1 (FIG. 2) can be received to display it on the input display column R2. In addition, at that time, the control unit 4 displays the direction number "14" among the directional diagram D, so as to enclose the direction number in rectangle in a different manner from other direction numbers. Accordingly, the user acknowledges that the direction number "14" faces a north direction. However, since it is difficult to associate the direction number "14" with the north direction and may forget the number, the user inputs and allocates the direction number "(0)" that is easily memorized and associated with the own north direction for the direction number 14, into an input display column R3. Accordingly, the control unit 4 displays the direction number "(0)", in the same direction as the direction number "14" among the directional diagram D, so as to enclose the direction number "(0)" in rectangle, in a different manner from other direction numbers.

Next, the user acknowledges that the direction number "(0)" indicates north, and then allocates the direction numbers "(1) to (5)" that the user itself can identify each direction, for the other direction numbers "0 to 13, 15". For example, when the user inputs the direction number "(1)" into the input display column R3 after the user inputs the "15" into the input display column R2, the direction number "(1)" can be allocated to the direction number "15". As shown in the direction diagram D of FIG. 4, the other direction numbers "(1) to (15)" are allocated in the clockwise direction from the direction that the direction number "(0)" is allocated, so that the direction number "(4)" indicates East, the direction number "(8)" indicates South, and the direction number "(12)" indicates West.

Figure 5:
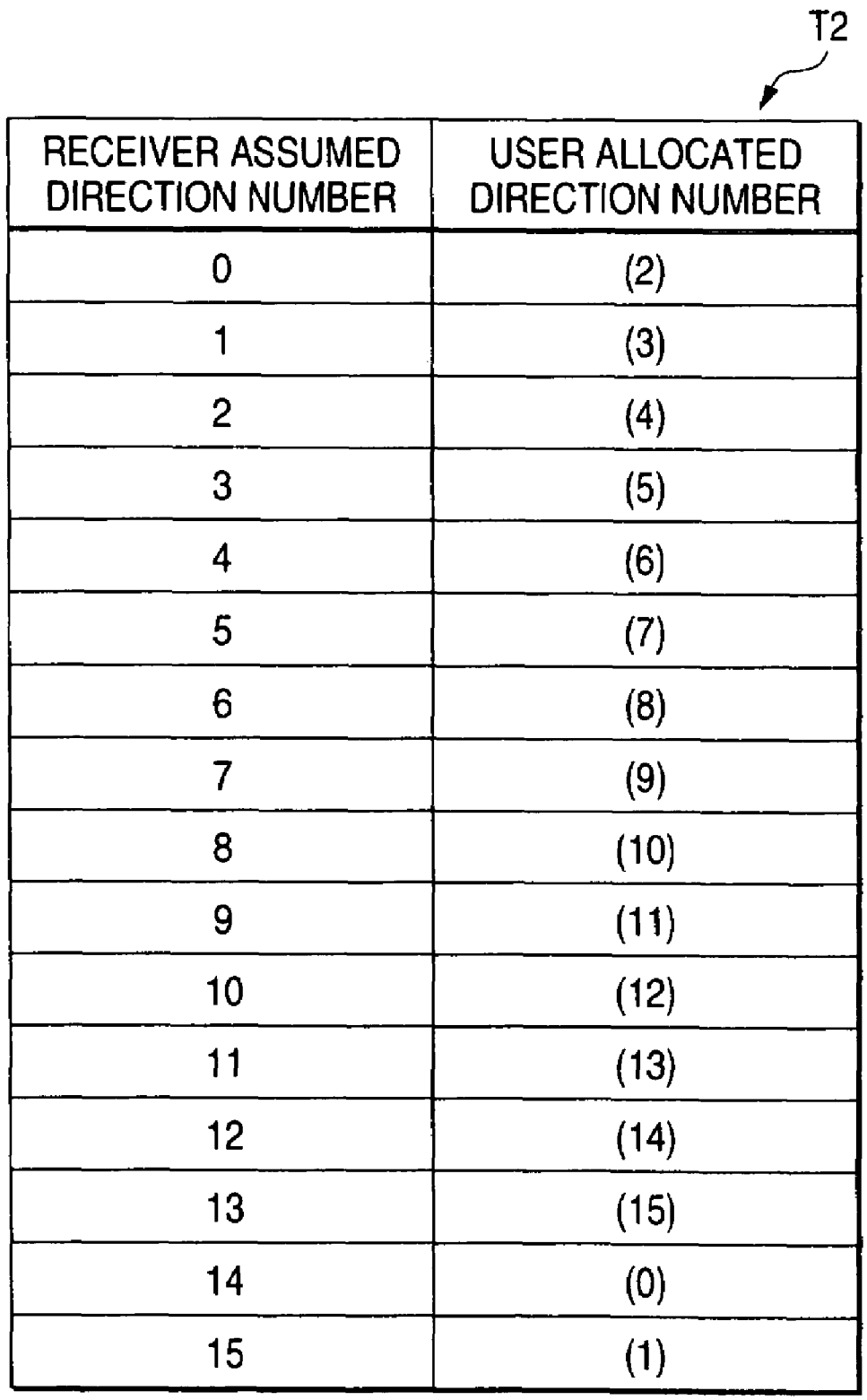
FIG. 5 is a diagram showing an example of storage contents of a memory in the broadcasting receiver.

After the direction numbers "(0) to (15)" are allocated to the respective direction numbers "0 to 15", when the user manipulates the remote controller 11 to press the determination button B3, the control unit 4 associates the respective direction numbers "0 to 15" with the respective direction numbers "(0) to (15)" respectively which are allocated to these, and records them into a predetermined region of the memory 8. Accordingly, the user/antenna direction correspondence table T2 as shown in FIG. 5 is provided on a predetermined region of the memory 8. In this table T2, the direction numbers "0 to 15" assumed by the broadcasting receiver 1 are shown on the left side, while the direction numbers "(0) to (15)" that the user can identify the direction for the respective direction numbers "0 to 15" are shown on the right side. Specifically, in the table T2, correspondence between the direction numbers "0 to 15" and the direction numbers "(0) to (15)" is recorded. In addition, after writing the table T2, when the user presses the cancel button B4, the control unit 4 cancels all information of the table T2. The user/antenna direction correspondence table T2 serves as the direction recording unit according to an embodiment of the present invention.

After writing the table T2 as described above, when the user manipulates the remote controller 11 and changes a channel into a desired channel number, the control unit 4 reads the direction numbers "0 to 15", that the broadcasting waves of the desired channel number can be received, from the above-mentioned table T1 (FIG. 2), and changes the directivity direction of the smart antenna 2 in the direction indicated by the read direction number "0 to 15". Further, when the smart antenna 2 receives the broadcasting wave of the desired channel number, the control unit 4 processes the received broadcasting wave through the tuner 5 and the signal processing unit 6 to display the images on the television 3 while simultaneously outputting the voices. In addition, simultaneously, the control unit 4 reads from the table T2 the direction numbers "(0) to (15)" corresponding to the direction numbers "0 to 15" indicating the directivity direction (directivity direction that switches the smart antenna 2) toward which the smart antenna faces, and displays the read direction number "(0) to (15)" along with the desired channel number on the television 3 through the above-mentioned OSD circuit 7.

Figure 6:
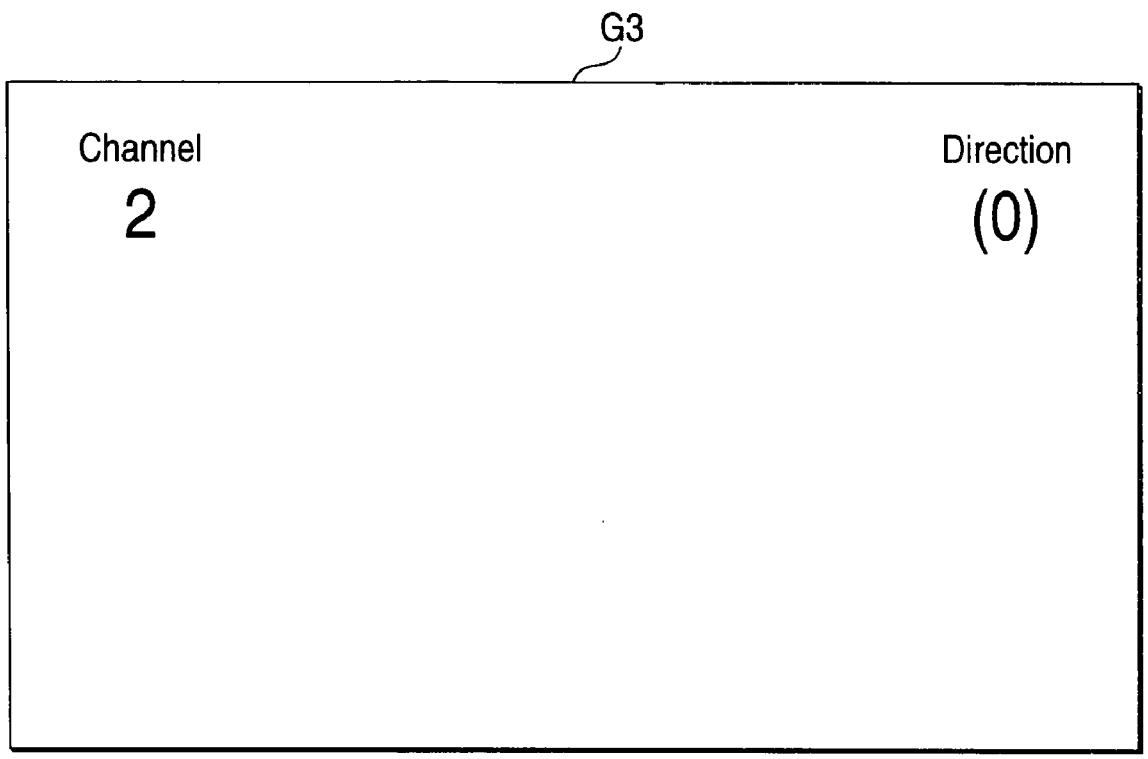
FIG. 6 is a diagram showing an example of a display screen of a television.

FIG. 6 is a diagram showing an example of a screen displayed on the television 3 at that time. On the right-upper side of the screen G3, "(0)" is displayed through the OSD as the direction number that the direction the smart antenna 2 faces can be identified. On the left-upper side of the screen G3, "2" is displayed through the OSD as a channel number selected by the user. For the overall screen G34 indicated by a shaded region, the broadcasting image of the received channel number "2" is reflected. In addition, when receiving a display instruction through a manipulation of the remote controller 11 as well as changing the channel, for example, the direction number that the direction of the smart antenna 2 can be identified may be displayed on the television 3.

With the above arrangement, the control unit 4 of the broadcasting receiver 1 can change the direction number indicating the directivity direction of the smart antenna 2 displayed on the television 3 into the direction number that the user can identify the direction. Further, the changed direction number is displayed on the television 3, so that the user may acknowledge the direction that the smart antenna 2 actually faces. As a result, the user can acknowledge which direction of the broadcasting stations A and A1 that transmits the currently receiving broadcasting with respect to the house H. In addition, when receiving sensitivity of the broadcasting wave varies depending on factors such as day and light, the weather or building surroundings around its house H, the user can acknowledge the direction of the broadcasting station A and A1 which the broadcasting can be received from, and the direction of the broadcasting station A and A1 which the broadcasting can not be received.

Next, for the antenna direction changing screen G1 shown in FIG. 3, the case where the antenna direction association button B2 is pressed will now be described. When the user manipulates the remote controller 11 to press the antenna direction association button B2, the control unit 4 displays the antenna direction correspondence screen G4 shown in FIG. 8, rather than the screen G1, on the television 3.

The antenna direction correspondence screen G4 is a screen for inputting the type number to a user for each kind of the smart antenna, so as to associate the direction number indicating each directivity direction preset in the smart antenna 2 with the direction number indicating each directivity direction of the smart antenna 2 assumed by the broadcasting receiver 1. The antenna direction correspondence screen G4 serves as the input unit according to an embodiment of the present invention. Referential symbol W refers to a display window, referential symbol K refers to a cursor, referential symbol B5 refers to a determination button, and referential symbol B6 refers to a cancel button. In the display window W, the type number of the smart antenna 2 that can be connected to the broadcasting receiver 1 is displayed many times. The type number of the smart antenna 2 that can be connected to the broadcasting receiver 1 is recorded into the antenna-by-antenna direction table T3 shown in FIG. 9, which is stored in advance in a predetermined region of the memory 8.

Figure 9:
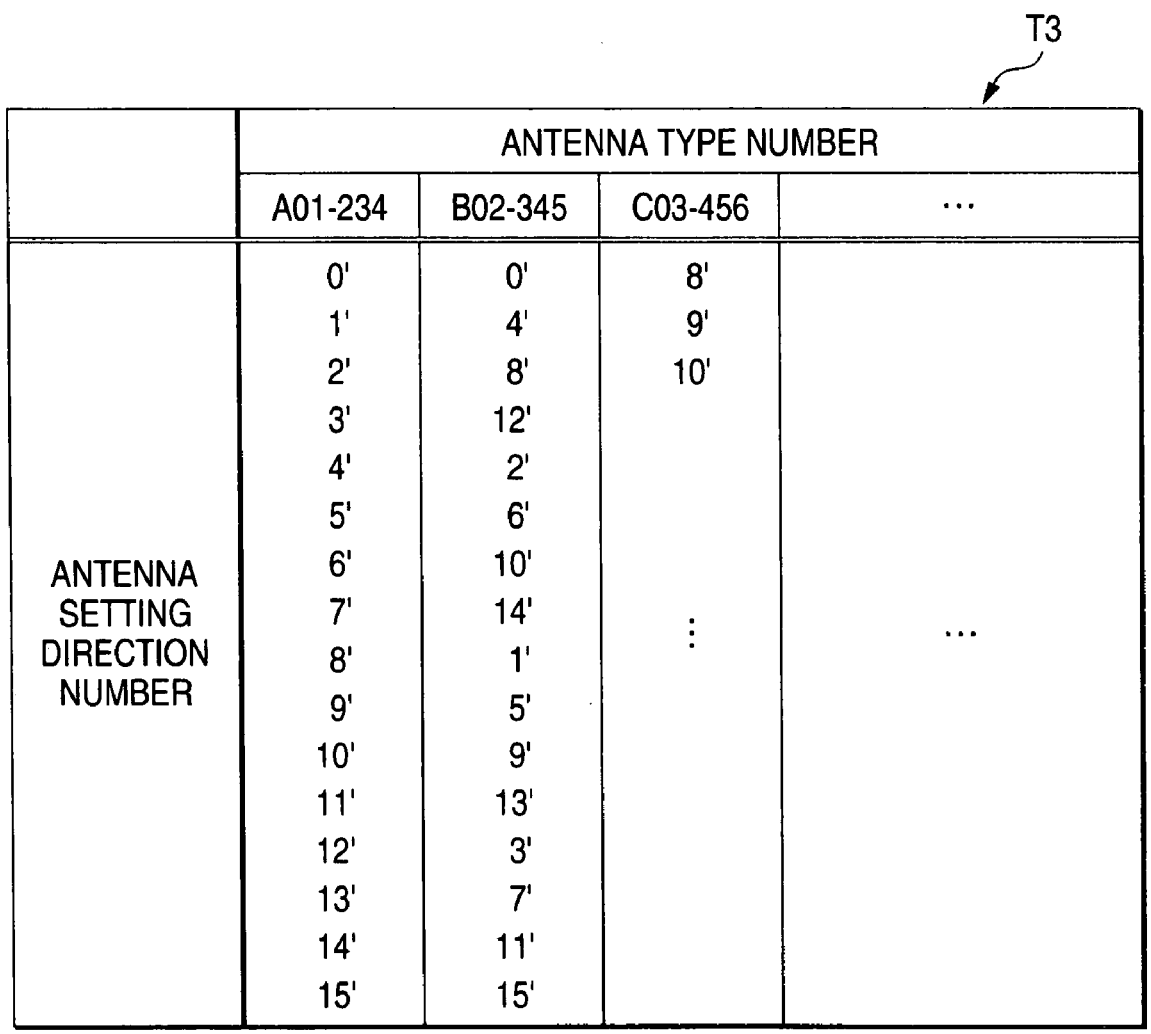
FIG. 9 is a diagram showing an example of storage contents of a memory in the broadcasting receiver.

In the antenna-by-antenna direction table T3 of FIG. 9, the direction numbers 0' to 15' indicating the respective directivity directions preset to the smart antenna 2 are recorded for each type number of the smart antenna 2. More specifically, through an operation check test, for example, an examined result of the correspondence between each direction number of the smart antenna 2 and each direction number of the broadcasting receiver 1 is recorded for each type number of the smart antenna 2. In addition, the record information of the table T3 can be updated by connecting the broadcasting 1 to the Internet, obtaining the most current recording information at a predetermined site on the Internet, and overwriting the obtained most current recording information on the existing recording information. The antenna-by-antenna direction table T3 serves as antenna-by-antenna direction recording unit according to an embodiment of the present invention.

Before describing a method of using the antenna direction correspondence screen G4 shown in FIG. 8, first, a correspondence between 0' to 15', the direction numbers preset to the smart antenna 2 and the "0 to 15", the direction numbers assumed by the broadcasting receiver 1 will be described with reference to FIGS. 11A and 11B. In FIGS. 11A and 11B, each directivity direction of the smart antenna 2 is shown in a straight line. A portion that respective straight lines intersect indicates the center of the smart antenna 2. In addition, while the apostrophe (') is attached likes as "0'" to "15'" preset to the smart antenna 2 in the present embodiment, this is, however, just a convenient expression for distinguishing from "0 to 15", the direction numbers assumed by the broadcasting receiver 1. Besides, both direction numbers may be distinguished in different fonts or colors, for example.

According to the current specification of the smart antenna, a method of attaching a direction number indicating a directivity direction is not unified, and thus smart antenna manufacturers and broadcasting receiver manufacturers independently attach the direction number. When the smart antenna 2 connected to the broadcasting receiver 1 is recommended products from the manufacturer of the broadcasting receiver 1, the correspondence between the direction numbers "0 to 5" assumed by the broadcasting receiver 1, and the direction numbers "0' to 5'" preset in the smart antenna 2 are already made through arbitration among manufacturers. In other words, as shown in FIG. 11A, each direction number "0 to 15" of the broadcasting receiver 1, and each direction number "0' to 15'" of the smart antenna 2 indicate all the same directions. In this case, it is not necessary to input the type number of the smart antenna 2 into the antenna direction correspondence screen G4 shown in FIG. 8. In addition, to ensure the correspondence between two direction numbers, the type number of the smart antenna 2 may be input. Further, when the smart antenna 2 connected to the broadcasting receiver 1 is not recommended products from the manufacturer of the broadcasting receiver 1, since there is no arbitration among manufacturers, the correspondence between the direction numbers "0 to 15" assumed by the broadcasting receiver 1, and the direction numbers "0' to 15'" preset in the smart antenna 2 is not made. In other words, as shown in FIG. 11B, each direction number "0 to 15" of the broadcasting receiver 1, and each direction number "0' to 15'" of the smart antenna 2 indicate different directions. In this case, to make correspondence between two direction numbers, it is necessary to input the type number of the smart antenna 2 into the antenna direction correspondence screen G4 shown in FIG. 8.

Figure 10:
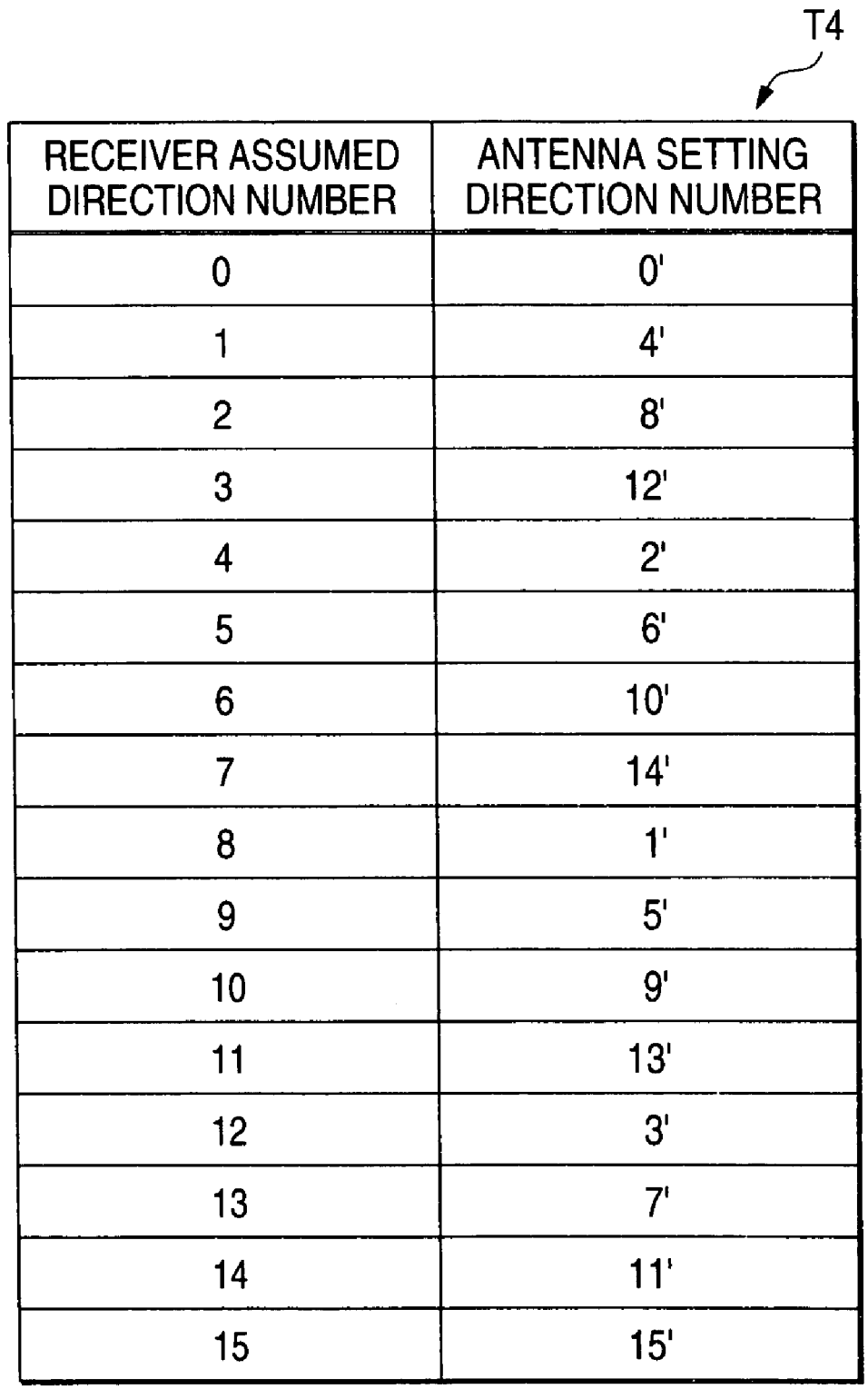
FIG. 10 is a diagram showing an example of storage contents of a memory in the broadcasting receiver.

For the antenna direction correspondence screen G4, first, the user manipulates the remote controller 11 and matches the cursor K to the type number of the smart antenna 2 connected to the broadcasting receiver 1. Further, the user manipulates the remote controller 11 to press the determination button B5 to designate the type number of the smart antenna 2. Then, the control unit 4 reads 0' to 15', each direction number information corresponding to the type number of the designated smart antenna, from the antenna-by-antenna direction table T3 of FIG. 3. Further, the control unit 4 associates each read direction number information "0'" to 15'"" with the direction numbers "0 to 15" assumed by the broadcasting receiver 1, and records the correspondence thereof into a predetermined region of the memory 8. Accordingly, a receiver/antenna direction correspondence table T4 is provided on the predetermined region of the memory 8, as shown in FIG. 10. In this table T4, the direction numbers "0 to 15" assumed by the broadcasting receiver 1 are shown on the left side, while the respective direction numbers "0' to 15'" preset in the smart antenna 2 corresponding to the respective direction numbers "0 to 15" are shown on the right side. In addition, after writing the table T4, when the user presses the cancel button B6, the control unit 4 deletes the entire information of the table T4. The user/antenna direction correspondence table T4 serves as the receiver direction recording unit according to an embodiment of the present invention.

When searching a broadcasting wave of the predetermined channel number, before writing the table T4, that is, before making correspondence between the direction numbers "0 to 15" assumed by the broadcasting receiver 1, and the direction numbers "0' to 15'" preset in the smart antenna 2, the control unit 4 transmits the direction numbers "0 to 15" indicating the directivity direction of the switching target of the smart antenna 2, to the smart antenna 2 by including the direction number into the control signal to instruct switching. For this reason, the control unit 4 attempts to find a tendency of receiving sensitivity of the broadcasting wave, for example, and in FIG. 12A, when the direction numbers "0 to 15" are included in the control signal in an increasing order and thus transmitted to the smart antenna 2 in a predetermined period, so as to change the directivity direction in the clockwise direction from the direction indicated by the direction number "0", the smart antenna 2 changes a directivity direction in an increasing order (circularly surrounding order in FIG. 12A) of the direction numbers 0' to 15'. Like this, when the directivity direction of the smart antenna 2 is changed in the order different from that assumed by the broadcasting receiver 1, the control unit 4 cannot find the tendency of the receiving sensitivity of the broadcasting wave at all, and thus search efficiency is lowered.

On the contrary, after writing the table T4, i.e., after the direction numbers "0 to 15" assumed by the broadcasting receiver 1 are associate with the direction numbers 0' to 15' preset in the smart antenna 2, the control unit 4 reads from the table T4 the direction number 0' to 15' corresponding to the direction number (0 to 15) indicating the directivity direction of the switching target of the smart antenna 2, and transmits the read direction number 0' to 15' to the smart antenna 2 by including the direction number into the control signal. Accordingly, as the control unit 4 changes the directivity direction in the clockwise direction from the direction that the direction number "0" indicates, in FIG. 12B, the direction numbers 0" to 15" are included into the control signal in an increasing order of the direction number 0 to 15 (0', 4', 8', 12', 2', 6', 10', 14', 1', 5', 9', 13', 3', 7', 11', and 15') and transmitted to the smart antenna 2 in a predetermined period, and the smart antenna 2 changes the directivity direction in the clockwise direction (circularly surrounding order of FIG. 12B from the direction that the direction number 0' indicates. When the directivity direction of the smart antenna 2 is changed in the order assumed by the broadcasting receiver 1, the control receiver 4 can find the tendency of receiving sensitivity of the broadcasting wave, and thus the search efficiency is not lowered.

With the above arrangement, the user can change the direction number indicating the directivity direction of the smart antenna 2 that the broadcasting receiver 1 deals with when switching the direction of the smart antenna 2, into the direction number according to each kind of the smart antenna 2. Further, based on the changed direction number, the directivity direction of the smart antenna 2 is changed and controlled, so that the directivity direction of the smart antenna 2 can be changed into the direction assumed by the broadcasting receiver 1 and thus an inappropriate control of the smart antenna 2 can be prevented.

Figure 13:
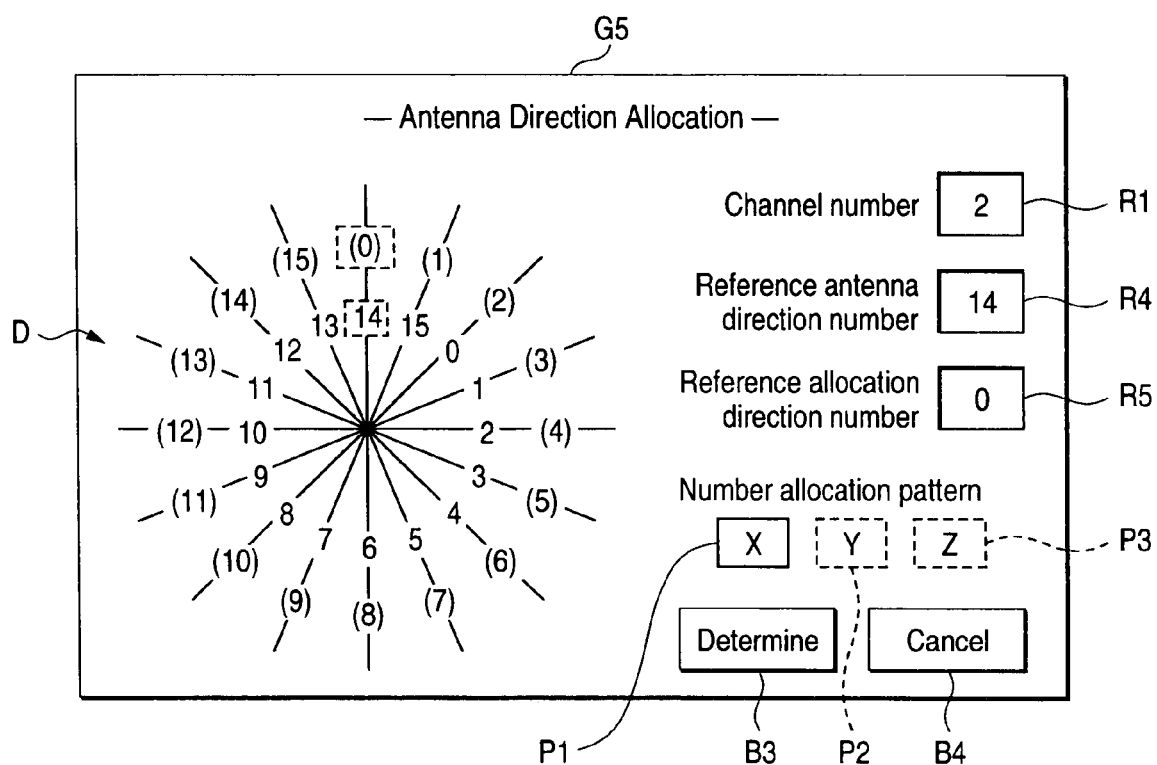
FIG. 13 is a diagram showing another embodiment of the present invention.

The present invention can employ various types other than the above-mentioned embodiments. For example, while the direction numbers "(0) to (15)" that the user can identify the direction are individually allocated for the respective direction numbers "0 to 15" in the embodiments shown in FIG. 4, the present invention is not limited thereto. In addition, for example, some allocation patterns may be specified in advance and stored in the predetermined region of the memory 8, and the user select any of the allocation patterns, and thus each direction number "(0) to (15)" may be automatically allocated to each direction number "0 to 15" based on the selected allocation pattern. FIGS. 13 and 14A-14C are diagrams illustrating an example of the above case. In addition, in FIG. 13, like numbers refers to like elements of FIG. 4. G5 shown in FIG. 13 is an antenna direction allocation screen as the allocating unit according to the present invention. R4 is an input display column into which the direction number is input or displayed as a reference among the direction numbers assumed by the broadcasting receiver 1. R5 is an input display column into which the direction number is input or displayed as a reference among the direction number the user allocates. P1 to P3 are selection buttons that select any one of three predefined allocation patterns, X, Y, and Z. Each allocation pattern X, Y, and Z is shown in FIGS. 14A-14C, and stored on the predetermined region of the memory 8. In addition, the pattern other than the aspect shown in FIGS. 14A-14C may be allocated and employed as a pattern, and the number of allocation patterns may be 2 or 4 or more.

For the antenna direction allocation screen G5, first, after the user finds that the broadcasting channel number of the broadcasting station A1 located in the north of the house is "2", "2" is input to the input display column R1. Then, the control unit 4 reads the direction number "14" that the broadcasting having the channel number of "2" can be received, from the channel preset table T1, and displays the direction number "14" in the input display column R4. Accordingly, the user acknowledges that the direction number "14" faces the north, so that, with respect to the direction number "14", the direction number "(0)" that the north direction can be identified is input to the input display column 5, and presses any one of the selection buttons and selects one of the allocation patterns X, Y, and Z. Then, the control unit 4 allocates each direction number "(0) to (15)" into each direction number "0 to 15" based on the selected allocation pattern X, Y, and Z, and displays them in the directional diagram D, as two direction numbers "14" and "(0)" indicate the same direction with the direction number "14" as a reference of the direction number assumed by the broadcasting receiver 1, and with the direction number "(0)" as a reference of the allocating direction number. Next, when the user presses the determination button B3, the control unit 4 associates each direction number "0 to 15" with each direction number "(0) to (15)" in an allocation type shown in the directional diagram D, records them into the predetermined region of the memory 8, and writes the user/antenna direction correspondence table T2 as shown in FIG. 5. With this arrangement, a burden from the allocation of the direction number of the user can be reduced.

Further, while an embodiment have been described in the context that the direction number "(0) to (15)" as identification information that the user can identify the direction is allocated to each direction number "0 to 15" of the smart antenna 2, and displayed on the screen G3 of the television 3, the present invention, however, is not limited thereto. Besides, letters "north, east, south, and west" representing each direction, and initials of English mark for each direction such as "N, W, E, and S, . . . " may be allocated to display. In addition, a diagram including arrows that indicates each direction or a mark may be displayed. When such letters or diagrams are displayed on the screen G3 of the television 3, the user can acknowledge each direction at a glance.

Figure 8:
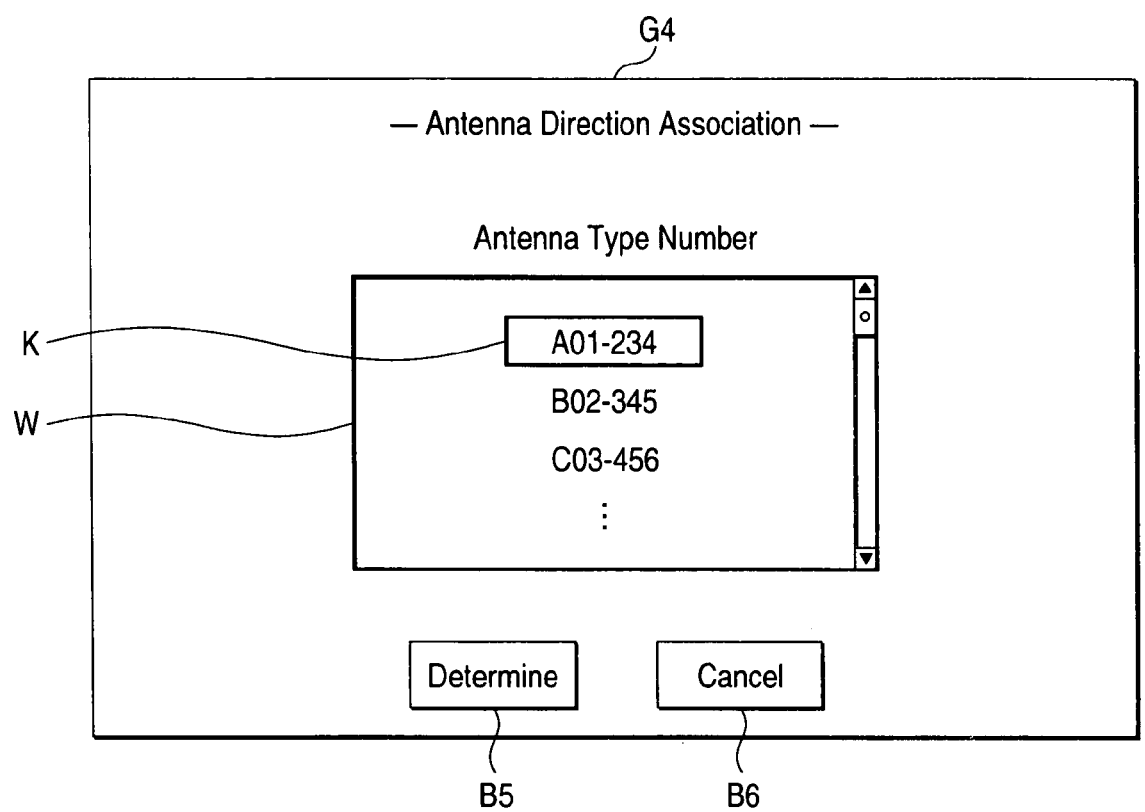
FIG. 8 is a diagram showing an example of a display screen of a television.

In addition, while the embodiment shown in FIG. 8 has been described in the context that the type number of the smart antenna 2 is designated as a classification of the smart antenna connected to the broadcasting receiver, the present invention, however, is not limited thereto. As the classification of the smart antenna, information such as a product name, a manufacturer name, or a serial number can be input, which can specify the antenna.

In addition, while the embodiment shown in FIGS. 12A and 12B has been described in the context that the directivity direction of the smart antenna 2 is changed in the clockwise direction from the direction that the direction number "0"

indicates, upon searching the broadcasting wave of the predetermined channel number, the present invention is not limited thereto. Even when the directivity direction of the smart antenna is changed in the order other than the above one, it can be changed as such.

Further, while the preceding embodiments have been described in the context that the present invention is applied to the broadcasting receiver 1 connected to the smart antenna 2, in addition to that, the present invention can also be applied to a broadcasting receiver connected to an antenna that can change the directivity in a plurality of directions, such as an adapter array antenna other than the smart antenna, for example. In addition, the present invention can be applied to a broadcasting receiver that receives a radio broadcasting or a broadcasting receiver that receives a satellite broadcasting, for example.

As described with reference to the embodiments, with respect to the direction information indicating each directivity direction of the directivity-switching antenna, when the user itself allocates identification information that the direction can be identified through the allocating unit, the identification information corresponding to the direction information indicating the directivity direction of the directivity-switching antenna, i.e., the identification information indicating the direction of the directivity in which the directivity-switching antenna actually faces is then displayed when the directivity direction of the directivity-switching antenna is displayed on the display means. In other words, direction information indicating the directivity direction of the directivity-switching antenna that the broadcasting deals with in displaying on the display means can be changed into the identification information the user can identify the direction. In addition, since the changed identification information is displayed, the user can acknowledge a directivity direction of the actual directivity-switching antenna.

According to the embodiments, when the user inputs the kind of the directivity-switching antenna connected to the broadcasting receiver through the input unit, the antenna direction information indicating each directivity direction preset to the corresponding directivity-switching antenna will be associated with the receiver direction information indicating each directivity direction assumed in the broadcasting receiver. In addition, subsequently, when changing the directivity direction of the directivity-switching antenna, switching the directivity direction of the directivity-switching antenna is controlled based on the antenna direction information corresponding to the receiver direction information indicative to the directivity direction of the switching object. In other words, the receiver direction information indicating the directivity direction of the directivity-switching antenna that the broadcasting receiver deals with the switching of the directivity of the directivity-switching antenna can be changed by the user into the direction information corresponding to the kind of the directivity-switching antenna. In addition, based on the changed direction information, the directivity direction of the directivity-switching antenna can be switched and controlled, so that the directivity direction of the directivity-switching antenna can be changed into the direction assumed by the broadcasting receiver and an inappropriate control of the directivity-switching antenna can be prevented.

In the embodiments, a smart antenna is used as a directivity-switching antenna. In the smart antenna, switching the directivity into 16 directions is specified in the specification. For this reason, the user can allocate each of direction information indicating 16 directivity directions of the smart antenna and identification information that the user itself can identify the direction, respectively, through the allocating unit. In addition, by inputting the kind of the smart antenna into the input unit, the user can correspond each of direction information indicating 16 directivity directions of the smart antenna assumed by the broadcasting receiver, into 16 pieces of direction information according to the kind of the smart antenna.

According to the embodiments, the receiver direction number indicating the directivity direction of the smart antenna that the broadcasting receiver deals with during displaying on the television receiver can be changed into the user direction number that the user can identify the direction. Further, since the changed user direction number is displayed on a screen of the television receiver, the user can acknowledge the directivity direction in which the smart antenna actually faces. In addition, the user can change the receiver direction number indicating the directivity direction of the smart antenna the broadcasting receiver deals with in switching the directivity of the smart antenna, into the antenna direction number corresponding to the smart antenna type number. Further, by switching and controlling the directivity direction of the smart antenna based on the changed antenna direction number, the directivity direction of the smart antenna can be changed into a direction assumed by the broadcasting receiver, so that an inappropriate control of the smart antenna can be prevented.

Although the present invention has been shown and described with reference to the embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A broadcasting receiver for receiving a broadcasting in a predetermined channel transmitted from a plurality of broadcasting stations by controlling a smart antenna that switches directivity in a plurality of preset directivity directions, the broadcasting receiver comprising:

an allocating unit that allocates identification information that allows a user to identify a direction with respect to direction information indicating each of the directivity directions of the smart antenna;

a direction recording unit that records correspondence between the direction information and the identification information;

a display controller that reads the identification information corresponding to the direction information indicating a directivity direction that the smart antenna faces, from the direction recording unit, and displays the identification information on a display connected to the broadcasting receiver;

an antenna-by-antenna direction recording unit that records antenna direction information indicating each directivity direction preset in the smart antenna, for each kind of smart antenna;

an input unit that allows a user to input a kind of the smart antenna;

an associating unit that reads the antenna direction information corresponding to each kind of input into the input unit, from the antenna-by-antenna direction recording unit to associate with the receiver direction information indicating each directivity direction that is assumed by the broadcasting receiver;

a receiver direction recording unit that records correspondence between the antenna direction information and the receiver direction information; and a switching controller that reads the antenna direction information corresponding to the receiver direction information indicating a directivity direction to be switched, from the receiver direction recording unit to switch the directivity direction of the smart antenna based on the given antenna direction information.

2. A broadcasting receiver for receiving a broadcasting in a predetermined channel transmitted from a plurality of broadcasting stations by controlling a directivity-switching antenna that switches directivity in a plurality of preset directivity directions, the broadcasting receiver comprising:

an antenna-by-antenna direction recording unit that records antenna direction information indicating each directivity direction preset in the directivity-switching antenna, for each kind of directivity-switching antenna;

an input unit that allows a user to input a kind of the directivity-switching antenna;

an associating unit that reads the antenna direction information corresponding to each kind of input into the input unit, from the antenna-by-antenna direction recording unit to associate wit the receiver direction information indicating each directivity direction that is assumed by the broadcasting receiver;

a receiver direction recording unit that records correspondence between the antenna direction information and the receiver direction information; and a switching controller that reads the antenna direction information corresponding to the receiver direction information indicating a directivity direction to be switched, from the receiver direction recording unit to switch the directivity direction of the directivity-switching antenna based on the given antenna direction information.

3. The broadcasting receiver according to claim 2, wherein the directivity-switching antenna is a smart antenna.

* * * * *